United States Patent
Sam et al.

(10) Patent No.: US 9,999,109 B2
(45) Date of Patent: Jun. 12, 2018

(54) LED LIGHTING ASSEMBLY

(71) Applicant: B/E AEROSPACE, INC., Wellington, FL (US)

(72) Inventors: Luis Sam, South Setauket, NY (US); Eric Johannessen, Holbrook, NY (US); Brendan Upton, East Patchogue, NY (US)

(73) Assignee: B/E Aerospace, Inc., Wellington, FL (US)

( * ) Notice: Subject to any disclaimer, the term of this patent is extended or adjusted under 35 U.S.C. 154(b) by 0 days. days.

(21) Appl. No.: 15/331,698

(22) Filed: Oct. 21, 2016

(65) Prior Publication Data

US 2018/0116030 A1    Apr. 26, 2018

(51) Int. Cl.
| H05B 33/08 | (2006.01) |
| H05B 37/02 | (2006.01) |
| F21K 9/278 | (2016.01) |
| F21K 9/272 | (2016.01) |
| F21V 3/02 | (2006.01) |
| F21Y 115/10 | (2016.01) |
| F21Y 103/10 | (2016.01) |
| F21K 9/275 | (2016.01) |

(52) U.S. Cl.
CPC ....... H05B 33/0887 (2013.01); H05B 33/083 (2013.01); H05B 33/0809 (2013.01); H05B 33/0851 (2013.01); H05B 37/0227 (2013.01); F21K 9/272 (2016.08); F21K 9/275 (2016.08); F21K 9/278 (2016.08); F21V 3/02 (2013.01); F21Y 2103/10 (2016.08); F21Y 2115/10 (2016.08)

(58) Field of Classification Search
CPC .............. H05B 33/083; H05B 33/0809; H05B 33/0851; H05B 33/0884; H05B 33/0887; H05B 37/0218; F21Y 2103/10
See application file for complete search history.

(56) References Cited

U.S. PATENT DOCUMENTS

| 2011/0057572 A1* | 3/2011 | Kit ..................... H05B 33/0809 315/185 R |
| 2015/0173138 A1* | 6/2015 | Roberts .............. H05B 33/0812 315/201 |
| 2015/0312987 A1* | 10/2015 | Gibbs ................ H05B 33/0887 315/122 |

OTHER PUBLICATIONS

PCT Search Report and Written Opinion issued in related application PCT/US2017/057542, dated Nov. 16, 2017, 10 pages.

* cited by examiner

*Primary Examiner* — Jimmy Vu
*Assistant Examiner* — Pedro C Fernandez
(74) *Attorney, Agent, or Firm* — Drinker Biddle & Reath LLP

(57) ABSTRACT

An LED lighting assembly includes, according to various implementations, mechanisms for protecting the LED lights from voltage or current surges, including hardware that absorbs the strike voltage and hardware that provides a bypass path. The provision of a bypass path in the event of the failure of one or LED lights in an LED string allows the string to be, in effect, "turned off" in order to protect the remaining LED lights, thereby allowing the healthy LED lights to stay lit.

18 Claims, 4 Drawing Sheets

LED LIGHTING ASSEMBLY

TECHNICAL FIELD

The present disclosure relates generally to light-emitting diode ("LED") lighting and, more particularly, to an LED lighting assembly for use as a replacement for a fluorescent bulb.

BACKGROUND

Fluorescent lighting is a relatively old technology. Traditional fluorescent lights include a ballast that activates the fluorescent bulb by applying an high initial voltage, often referred to as the "strike voltage," which can be on the order of 500 to 1000 volts. Once the fluorescent light is on, it only needs a relatively low voltage to keep the bulb lit. With LED lights becoming more popular, a market for LED replacement bulbs that fit into fluorescent light fixtures has developed. One challenge that such replacement bulbs face is the issue of the strike voltage. LED lights generally are not designed to withstand voltage as high as the strike voltage. Thus, many current LED replacement bulbs require the ballast to be removed from the fluorescent light fixture in order to keep the LED lights from being damaged.

DRAWINGS

While the appended claims set forth the features of the present techniques with particularity, these techniques, together with their objects and advantages, may be best understood from the following detailed description taken in conjunction with the accompanying drawings of which:

DESCRIPTION

Various embodiments of the present disclosure include an LED lighting assembly having the same physical shape and appearance as a fluorescent bulb, but having the superior illumination characteristics of LED lights (e.g., the ability to dim, the absence of flicker).

In various embodiments, the LED lighting assembly includes various mechanisms for protecting the LED lights from voltage or current surges, including hardware that absorbs the strike voltage and hardware that provides a bypass path. The provision of a bypass path in the event of the failure of one or LED lights in an LED string allows the string to be, in effect, "turned off" in order to protect the remaining LED lights, thereby allowing the healthy LED lights to stay lit.

According to various embodiments, the LED lighting assembly includes a circuit with a bypass path whose voltage presented (e.g., impedance presented) is controlled through the use of driver hardware, such as a transistor (e.g., a metal oxide semiconductor field effect transistor). This configuration allows the circuit to present a relatively constant voltage (e.g., relatively constant load) to a ballast circuit (e.g., on a fluorescent lighting unit), but still allow the brightness of the LED lights to be varied. In other words, the LED lights get powered from the ballast circuit, but the bypass path (which is parallel to the LED lights) can be used to shunt additional current to decrease the amount of current going to the LED lights. This allows the circuit of the lighting assembly to keep approximately the same overall forward voltage (e.g., within a few volts) but to decrease the output of the LED lights, with the excess power being converted into heat at the driver hardware and through other resistive elements (e.g., ballast resistors) electrically connected in series with the driver hardware. This gives the ability to, for example, fade on and fade off the LED lights in a way that is visually superior to conventional fluorescent lights but still transparent to the ballast in terms of voltage. Additionally, it also gives the ability to fine tune the brightness of the LED lights, so that, for example, if there is a different LED bin being used for the LED lights, and the LED lights are brighter than previous bins, the brightness can be reduced by bypassing the appropriate amount of current.

Figure 1:
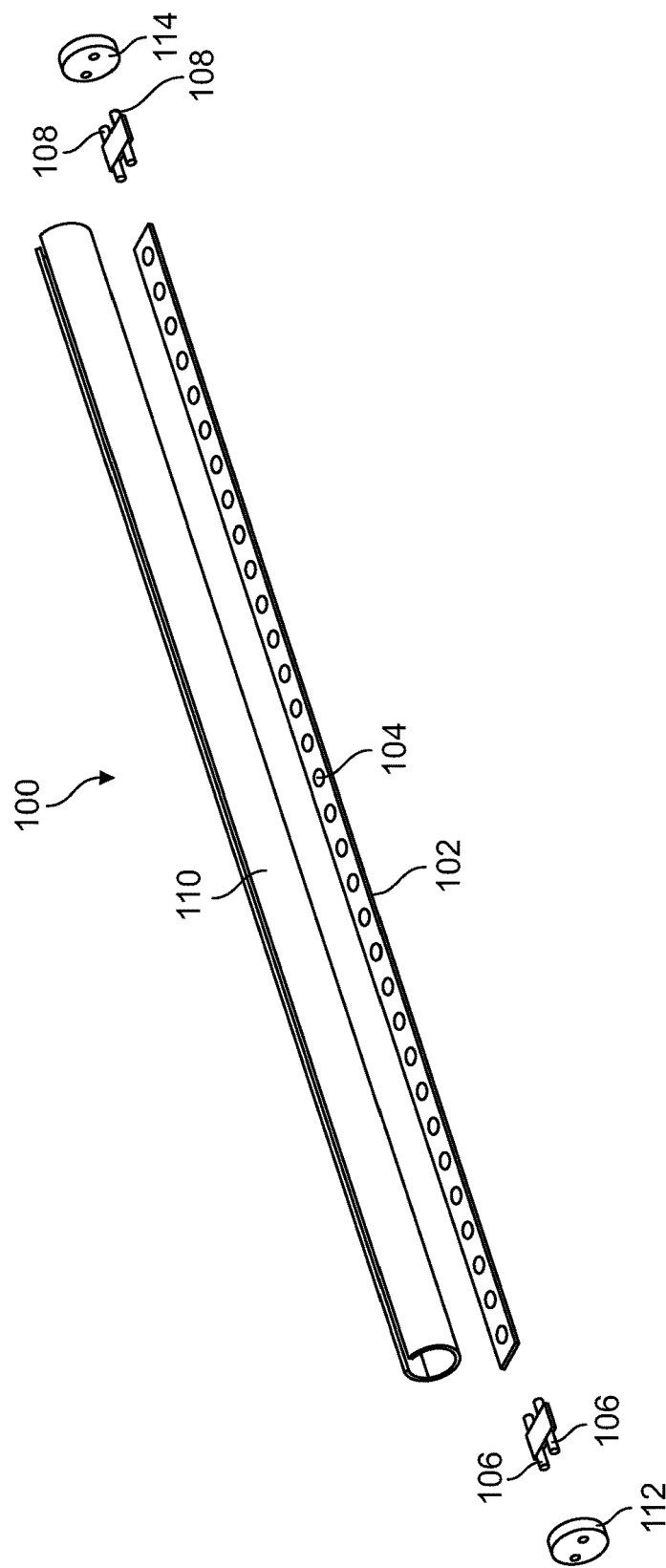
FIG. 1 is a disassembled view of an LED lighting assembly configured according to an embodiment.

Turning to FIG. 1, an LED lighting assembly, generally labeled 100, includes a printed circuit board ("PCB") 102 on which there are LED lights 104. Each LED light 104 may include an LED and a lens. A first pair of pins 106 is attached to a first end of the PCB 102 and a second pair of pins 108 is attached to a second end of the PCB 102. In effect, the pins 106 form a first bi-pin and the pins 108 form a second bi-pin. The first and second bi-pins are configured to fit into a standard tube-style fluorescent light socket. Overall, the LED lighting assembly 100 is configured to be a replacement for a fluorescent bulb.

The PCB 102 is contained in a housing 110, at least a portion of which is translucent or transparent. A first end cap 112 closes off the housing 110 at a first end and a second end cap 114 closes off the housing 110 at a second end. The first and second end caps each have a pair of holes through which the pins (of the first and second bi-pins) pass.

Figure 2:
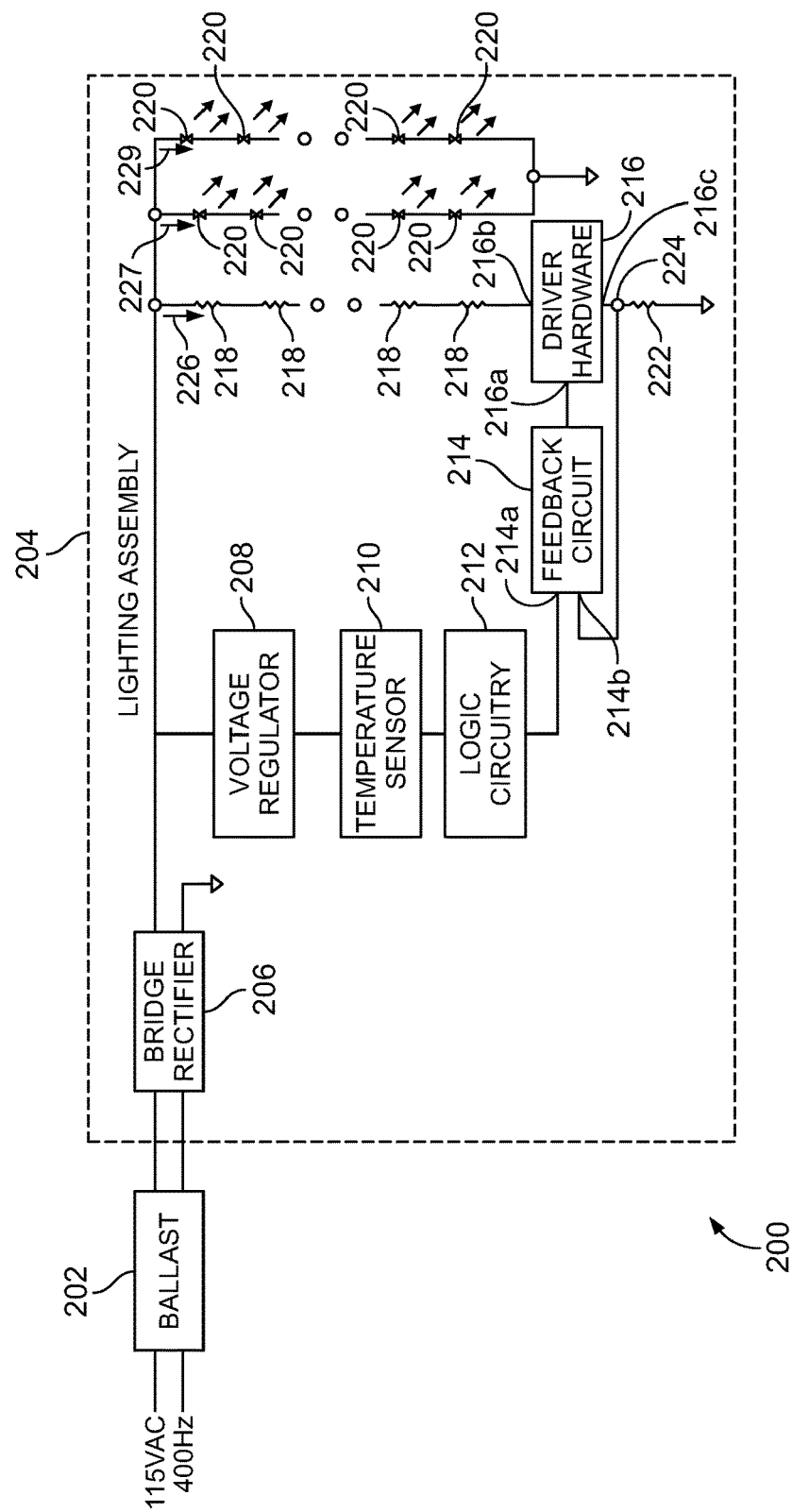
FIG. 2 is a block diagram of a light fixture configured according to an embodiment.

Turning to FIG. 2, a block diagram of a light fixture configured according to an embodiment is shown. The light fixture, generally labeled 200, includes a ballast 202 that receives power in the form of a 115 volt alternating current ("VAC") with a frequency of 400 Hertz ("Hz"). It is to be understood that the current, voltage, and frequency values disclosed herein are merely illustrative and other values may be used. The light fixture 200 further includes an LED lighting assembly 204 ("lighting assembly 204"). The lighting assembly 204 may be removable and replaceable and may have the configuration depicted in FIG. 1. The lighting assembly 204 includes a bridge rectifier 206 ("rectifier 206") that receives alternating current ("AC") from the ballast 202 (via bi-pins, which are not depicted in FIG. 2) and rectifies the AC into direct current ("DC"). Put another way, the rectifier 206 converts the AC voltage received by the lighting assembly 204 into a DC voltage. The lighting assembly 204 further includes a voltage regulator 208 that regulates the voltage of the DC current, a temperature sensor 210 that senses the temperature of the lighting assembly 204 (particularly in the vicinity of the LED lights, such as at the PCB 102), logic circuitry 212, a feedback circuit 214, driver hardware 216, resistive elements 218 (e.g., ballast resistors), LED lights 220, a sense resistor 222. Possible implementations of the driver hardware 216 include a field-effect transistor (e.g., a metal oxide semiconductor FET ("MOSFET")). The temperature sensor 210 and the logic circuitry 212 both receive power from the voltage regulator 208. The resistive elements are electrically connected in series along a first circuit path 226 and the LED lights 220 are electrically connected in series along a second circuit path 227 and a third circuit path 229. The number of circuit paths shown is meant only to be illustrative, but generally include at least one circuit path for at least one driver hardware, and at least one circuit path for at least one set of LED lights.

The logic circuitry 212 (e.g., microprocessor, microcontroller, application-specific integrated circuit ("ASIC"), or field-programmable gate array ("FPGA")) generates a pulse-width modulated ("PWM") voltage signal and provides the signal to the driver hardware 216 at one or more frequencies and/or pulse widths in order to control the driver hardware 216 to increase or decrease the voltage of the first circuit path 226 (by controlling the impedance of the driver hardware 216). Put another way, the logic circuitry controls the driver hardware 216 to permit or restrict the flow of DC current from the bridge rectifier 206 to the LED lights 220.

In an embodiment, the PWM voltage gets converted to DC voltage by one or more filtering elements (not shown in FIG. 2). The feedback circuit 214 receives, as inputs, (a) the DC voltage and (b) the voltage of a node 224, which is also the voltage at the sense resistor 222. The feedback circuit 214 operates to maintain the two input voltages (at a first input 214a and a second input 214b) at or about the same level. If the voltage at the first input 214a exceeds the voltage at the second input 214b, the feedback circuit 214 increases its output voltage, which has the effect of increasing the voltage at an input 216a of the driver hardware 216. Once the voltage at the input 216a exceeds a predetermined threshold, the driver hardware 216 permits current to flow (or increases the amount of current flowing) from 216b to 216c, which will have the effect of increasing the voltage at node 224 and, therefore, at the second input 214b. If, on the other hand, the voltage at the second input 214b exceeds the voltage at the first input 214a, the feedback circuit 214 decreases its output voltage, which has the effect of decreasing the voltage at the input 216a of the driver hardware 216. Once the voltage at 216a falls below a predetermined threshold, the driver hardware 216 decreases (or prevents) current from flowing from 216b to 216c, which will have the effect of decreasing the voltage at node 224 and, therefore, at 214b.

By the adjustment process described above, the feedback circuit 214 may, under the control of the logic circuitry 212, linearly regulate the current that flows down the first circuit path 226 which, in the embodiment illustrated in FIG. 2, is the current that flows through the series of resistive elements 218. In other words, by decreasing the voltage of the first circuit path 226, the logic circuitry 212 causes more of the overall current originating from the ballast 202 (via the rectifier 206) to be drawn by the first circuit path 226, thereby decreasing the amount of current going down the second current path 227 and the third current path 229. This has the effect of decreasing the voltage across the LED lights 218. As a result, the logic circuitry 212 is able to control the output of the LED lights 218. In short, the logic circuitry 212 in effect regulates the current that flows through the LED lights 220 (and, therefore, their brightness).

The resistive elements 218 in this embodiment serve as ballast resistors to ensure that the driver hardware 216 is not subjected to excessive voltage. Other embodiments may not have the resistive elements 218, however.

Figure 3A:
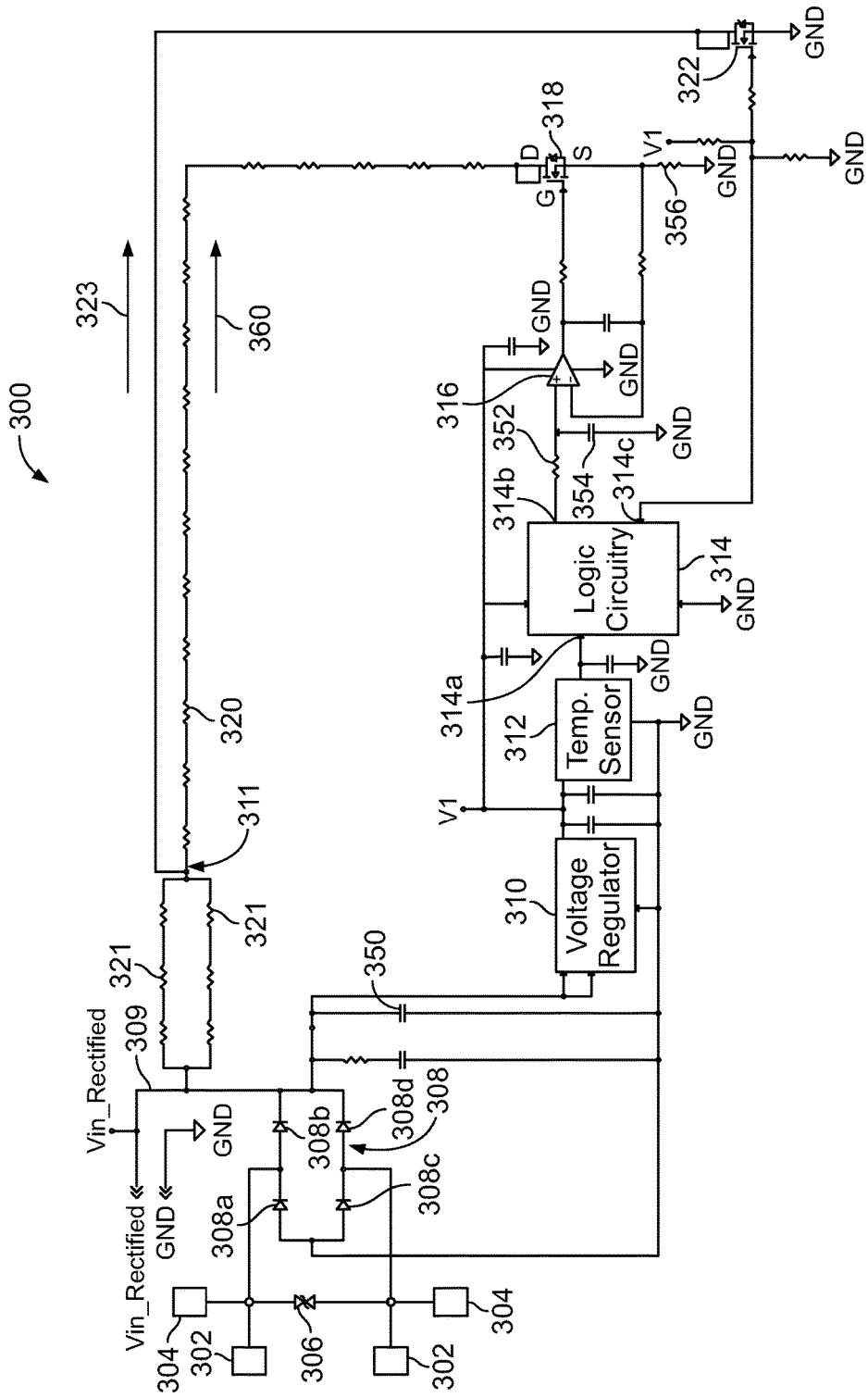
FIG. 3A and FIG. 3B are a circuit diagram of an LED lighting assembly configured according to an embodiment.
Figure 3B:
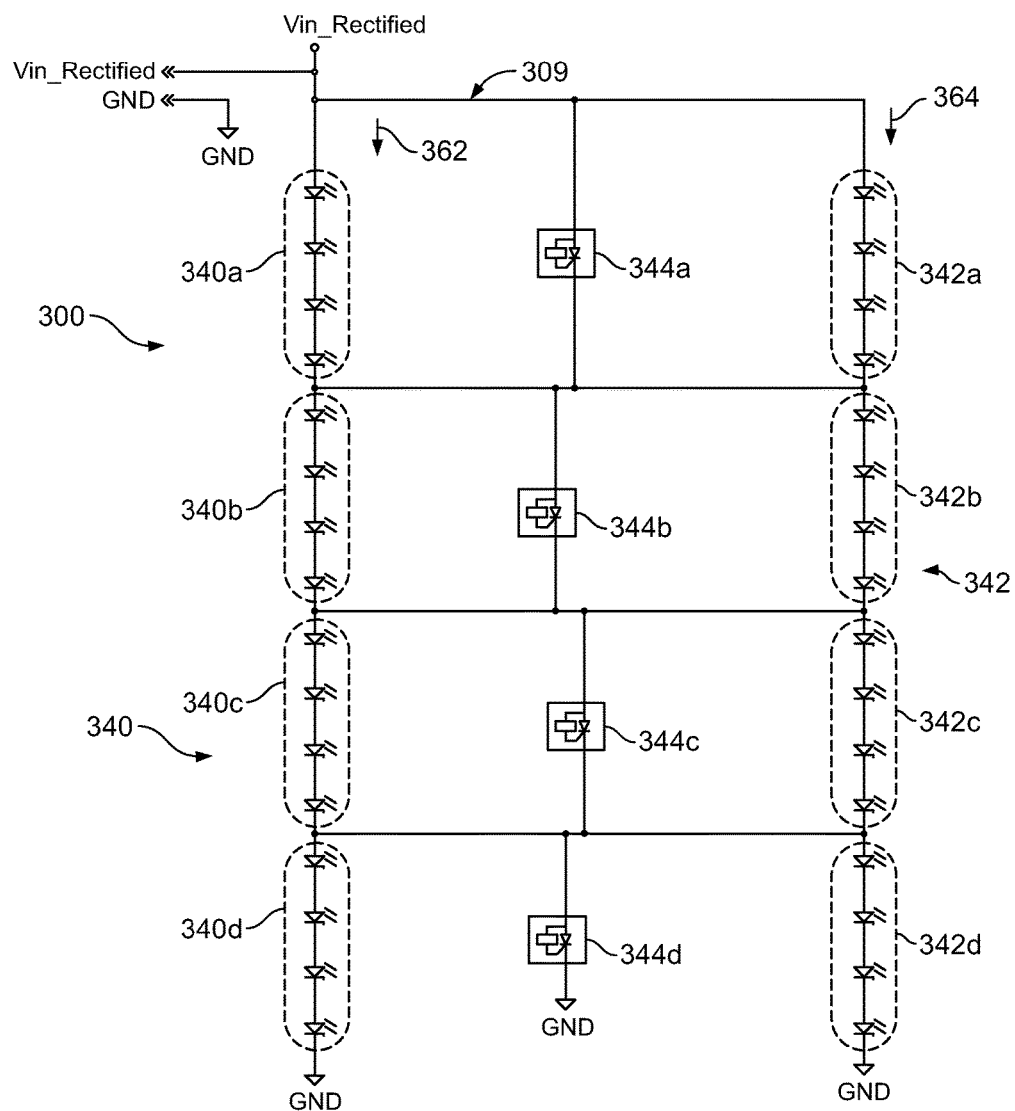

Turning to FIG. 3A and FIG. 3B, a circuit diagram of an LED lighting assembly configured according to an embodiment is shown. The LED lighting assembly, generally labeled 300 ("lighting assembly 300"), is a more specific implementation of the lighting assembly 204 of FIG. 2. The lighting assembly 300 includes a first pair of pins 302 and a second pair of pins 304, which serve the same purpose described above in FIG. 1 (pins 104 and 106) and may also be configured as bi-pins. The lighting unit 300 further includes a transient voltage suppressor ("TVS") 306 (e.g., a modified Zener diode), which receives the input power via the pins 302 and 304, and a rectifier 308 connected in parallel with the TVS 306. In an embodiment, the rectifier 308 includes fast recovery diodes 308a, 308b, 308c, and 308d, and is electrically connected to a node 309.

The lighting assembly 300 further includes a voltage regulator 310, a temperature sensor 312, logic circuitry 314, a differential amplifier 316 (depicted as an operational amplifier with negative feedback) whose positive input is electrically connected to an output 314b of the logic circuitry 314, and driver hardware 318 (depicted as a metal-oxide-semiconductor field-effect transistor ("MOSFET") whose gate is electrically connected to the output of the differential amplifier 316). The lighting assembly 300 further includes safety circuit 322 (depicted as a MOSFET whose gate is electrically connected to an output 314c of the logic circuitry 314).

The voltage regulator 310 may operate at low power so as to provide just enough power to allow the temperature sensor 312, logic circuitry 314, and differential amplifier 316 to operate. The temperature sensor 312 measures the temperature in its vicinity (e.g., at the PCB 102) and generates a signal representing the temperature. The temperature sensor 312 provides the signal to an input 314a of the logic circuitry 314. The logic circuitry 314 may then adjust its output to the differential amplifier 316 based on the temperature signal in order to account for the temperature. For example, if the temperature signal indicates that the temperature is greater than or equal to a first predetermined threshold, the logic circuitry 314 may change the PWM output to increase the brightness of the LED lights (because high temperatures would make the LED lights less efficient). If the signal indicates that the temperature is greater than a second predetermined threshold (e.g., one higher than the first), the logic circuitry 314 may generate an output to the safety circuit 222 to turn off the LED lights.

The lighting assembly 300 also includes a series of resistive elements 320 (which act as ballast resistors) that are electrically connected in series to a node 311 along a first circuit path 360. Parallel to the first circuit path 360 is a second circuit path 323 from the node 311 to the safety circuit 322. Also included are two groups of series resistive elements 321 electrically connected to a nodes 309 and 311, electrically connected in parallel (the two groups) with each other, and electrically connected (the combined two groups) in series with the resistive elements 320.

The lighting assembly 300 also includes strings of LED lights, with the LED lights in each string being electrically connected in series by group. Turning to FIG. 3B, a first LED string 340 and a second LED string 342 are depicted. The LED lights of the first string 340 are electrically connected in series along a third circuit path 362 and the LED lights of the second LED string 342 are electrically connected in series along a fourth circuit path 364. The first LED string 340 and second LED string 342 are electrically connected to the node 309 in parallel with one another and in parallel with the two groups of resistive elements 321. The first string 340 includes a first group 340a of LED lights, a second group 340b of LED lights, a third group 340c of LED lights, and a fourth group 340d of LED lights. Similarly, the second string 342 includes a first group 342a of LED lights, a second group 342b of LED lights, a third group 342c of LED lights, and a fourth group 342d of LED lights. A first bypass circuit 344a is electrically connected in parallel with the first groups 340a and 342a, a second bypass circuit 344b is electrically connected in parallel with the second groups 340b and 342b, a third bypass circuit 344c is electrically connected in parallel with the third groups 340c and 342c, and a fourth bypass circuit 344d is electrically connected in parallel with the fourth groups 340d and 342d.

During operation of the lighting assembly 300, a ballast (such as the ballast 202 of FIG. 2) generates a strike voltage at the first and second pairs of pins 302 and 304. The TVS 306 absorbs the strike voltage, which has the effect of protecting the LED lights of the first string 340 and the second string 342. The portion of the strike voltage that the TVS 306 does not absorb gets rectified by the rectifier 306 and, to a significant extent, absorbed by (stored in) the capacitor 350.

In an embodiment, the logic circuitry 314 generates a PWM voltage at the output 314a, which the resistive element 352 and capacitive element 354 filter, thereby converting the PWM voltage into a DC voltage. The positive input of the differential amplifier 316 receives the DC voltage.

The voltage across a resistive element 356 (electrically connected to ground, to the source of the driver hardware 318, and to a junction with a circuit path leading back to the differential amplifier 316) acts as a feedback voltage to the differential amplifier 316. In other words, the voltage at the negative input of the differential amplifier is the same as the voltage across the resistive element 356. The resistive element 356 may be implemented as a sense resistor. The differential amplifier 316 will act to keep the voltage at the positive input of the differential amplifier 316 the same as the voltage at the negative input of the differential amplifier 316. Thus, if the voltage at the positive input exceeds the voltage at the negative input, the differential amplifier 316 increases its output voltage, which has the effect of increasing the voltage at the input (e.g., the gate) of the driver hardware 318. Eventually, the voltage at the gate of the driver hardware 318 reaches the level at which the driver hardware 318 permits current to flow through driver hardware 318 (e.g., from the drain to the source).

Once the voltage at the negative input exceeds the voltage at the positive input, the differential amplifier 316 responds by decreasing its output voltage, which has the effect of decreasing the voltage at the input of the driver hardware 318. Once the voltage at the input of the driver hardware 318 reaches a threshold voltage (on its way down), the driver hardware 318 inhibits current from flowing through it (e.g., from the drain to the source). In this manner, the driver hardware 318 may, under the control of the logic circuitry 314, linearly regulate the current that flows through the electrical path 360 which, in the embodiment illustrated in FIG. 3A, is the current that flows through the series of resistors 320. By doing this, the logic circuitry 314 regulates the amount of current that flows through the LED strings 340 and 342.

Put differently, using the adjustment process described above, the differential amplifier 316 may, under the control of the logic circuitry 314, linearly regulate the current that flows through down the first circuit path 360 which, in the embodiment illustrated in FIGS. 3A and 3B, is the current that flows through the series of resistive elements 320. In other words, by decreasing the voltage of the first circuit path 360, the logic circuitry 212 causes more of the overall current originating from the ballast (via the rectifier 308) to be drawn by the first circuit path 360, thereby decreasing the amount of current going down the third current path 362 and the fourth current path 364. This has the effect of decreasing the voltage across the LED lights of the first string 340 and the second string 342. As a result, the logic circuitry 314 is able to control the output of the LED lights.

In an embodiment, the safety circuitry 322 has a default state of "off," so that if the lighting assembly 300 experiences some sort of malfunction, the safety circuitry 322 presents such a low voltage (low impedance) that the current from pins 302 and 304 is largely routed to the safety circuit 322 and, thus, the LED lights of the first and second strings 340 and 342 are not able to turn on at all. The voltage drop that the driver hardware 318 creates is generally lower than the voltage drop that the safety circuit 322 is able to create. For example, the driver hardware 318 (under control of the logic circuitry 314), might be able to reduce the voltage of the first circuit path 360 (reduce the impedance) to a level that draws away up to 20% of the current from the LED lights, which, in some embodiments, would be enough to dim the LED lights, but not turn them off. Continuing with the example, the safety circuit 322 might be able to reduce the voltage of the second circuit path 323 (reduce the impedance) to a level that draws away 50% of the current from the LED lights, which, in some embodiments, would be enough to shut off the LED lights (or prevent them from lighting in the first place).

Turning again to FIG. 3B, in an embodiment, one or more of the bypass circuits 344a, 344b, 344c, and 344d includes a silicon controlled rectifier ("SCR") that shorts out to a low voltage state (e.g., 6 volts) once the voltage across it reaches or exceeds a particular threshold. This action has the effect of bypassing one or more groups of LED lights but leaving the other groups LED lights on and emitting light.

An LED lighting assembly includes: one or more LED lights; logic circuitry; driver hardware electrically connected in parallel with the one or more LED lights; a feedback circuit that receives a first voltage input from the logic circuitry, receives a second voltage input from a point on a circuit path that is in series with the driver hardware, compares the first voltage input with the second voltage input, and outputs a voltage to the driver hardware based on the compared first and second voltage inputs. In an embodiment, the driver hardware permits or restrict the flow of current through driver hardware based on the voltage output by the feedback circuit, thereby increasing or decreasing the flow of current through the one or more LED lights.

In an embodiment, the driver hardware is a metal oxide semiconductor field effect transistor whose gate is electrically connected to the output of the feedback circuit and whose source and drain are electrically connected on a circuit path that is in parallel with the one or more LEDs.

In an embodiment, the feedback circuit is a differential amplifier, the first voltage input is at a positive input of the differential amplifier, and the second voltage input is at a negative input of the differential amplifier.

In an embodiment, the LED lighting assembly also includes a first input pin; a second input pin; and a transient voltage suppressor electrically connected to the first input pin and the second input pin such that when the LED lighting assembly is subjected to a strike voltage via the first and second input pins, the transient voltage suppressor absorbs the strike voltage.

In an embodiment, the LED lighting assembly further includes a rectifier that is electrically connected in parallel with transient voltage suppressor, in which the rectifier converts AC voltage received by the LED lighting assembly into DC voltage.

In an embodiment, the one or more LED lights are organized into a plurality of groups, and the LED lighting assembly further includes a bypass circuit electrically connected in parallel with at least two of the plurality of groups such that when the voltage across the bypass circuit reaches a threshold level, the bypass circuit shorts, thereby causing current to flow through the bypass circuit instead of through first and second groups of LED lights.

In an embodiment, the LED lighting assembly also includes a safety circuit electrically connected in parallel with the driver hardware, in which an output of the logic circuitry is electrically connected to the input of the safety circuit and the logic circuitry controls whether the safety circuit allows or restricts the flow of current through the safety circuit.

In various embodiments, an LED lighting assembly is configured to be electrically coupled to a fluorescent lighting fixture that includes a ballast. The LED lighting assembly includes: a plurality of groups of LED lights; a bypass circuit in parallel with at least two of the plurality of groups of LED lights, such that when a group of LED lights of the plurality of groups experiences a failure resulting in the voltage across the bypass circuit reaching a threshold level, the bypass circuit reconfigures itself so as to allow more current to flow through the bypass circuit, thereby reducing the amount of voltage being applied across the group of LED lights that experienced the failure.

According to an embodiment, the LED lighting assembly also includes logic circuitry; driver hardware electrically connected in parallel with the plurality of groups of LED lights; and a feedback circuit that receives a first voltage input from the logic circuitry, receives a second voltage input from a point on a circuit path that is in series with the driver hardware, compares the first voltage input with the second voltage input, and outputs a voltage to the driver hardware based on the compared first and second voltage inputs. In this embodiment, the driver hardware permits or restrict the flow of current through driver hardware based on the voltage output by the feedback circuit, thereby increasing or decreasing the flow of current through the plurality of groups of LED lights.

In an embodiment, an LED lighting assembly is configured to be electrically coupled to a fluorescent lighting fixture that includes a ballast. In this embodiment, the LED lighting assembly includes: a plurality of input pins configured to be electrically connected to sockets of the fluorescent lighting fixture; a transient voltage suppression diode in parallel with the plurality of input pins so as to absorb the strike voltage of the ballast when the fluorescent lighting fixture is turned on; a rectifier in parallel with the transient voltage suppression diode, the rectifier configured to rectify AC voltage into a DC voltage; and a plurality of LED lights that are subjected to the DC voltage.

In an embodiment, the LED lighting assembly further includes a transistor disposed in series with the plurality of LED lights. The transistor is configured to prevent the DC voltage from acting on the LED lights when the florescent lighting unit is initially powered on.

In an embodiment, the LED lighting assembly further includes: logic circuitry; driver hardware electrically connected in parallel with the plurality of LED lights; a feedback circuit that receives a first voltage input from the logic circuitry, receives a second voltage input from a point on a circuit path that is in series with the driver hardware, compares the first voltage input with the second voltage input, and outputs a voltage to the driver hardware based on the compared first and second voltage inputs. Also in this embodiment, the driver hardware permits or restrict the flow of current through the driver hardware based on the voltage output by the feedback circuit, thereby increasing or decreasing the flow of current through the one or more LED lights.

According to an embodiment, the LED lighting assembly further includes a metal oxide semiconductor field effect transistor whose gate is electrically connected to an output of the logic circuitry, is disposed in series with the plurality of LED lights, and which is configured to prevent the DC voltage from acting on the LED lights when the florescent lighting fixture is initially powered on.

FIGS. 2, 3A, and 3B each show lines that are to be understood as conductive paths (e.g., wires, traces on a circuit board, or conductive paths on a silicon chip). It is to be understood that other elements may lie along each of the conductive paths and that the arrangement depicted is only meant to be illustrative. Also, some of the paths show ellipses, meaning that there may be more of the same elements (e.g., more resisters along circuit path 226, more LED lights along circuit paths 227 and 229) that are omitted for the sake of clarity of the figures.

It should be understood that the embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope.

What is claimed is:
1. A light emitting diode (LED) lighting assembly comprising:
one or more LED lights;
logic circuitry;
one or more resistive elements electrically connected in parallel with the one or more LED lights;
a transistor electrically connected in parallel with the one or more LED lights and in series with the one or more resistive elements;
a differential amplifier that
receives a first voltage input from the logic circuitry,
receives a second voltage input from a point on a circuit path that is in series with the transistor,
compares the first voltage input with the second voltage input, and
outputs a voltage to a gate of the transistor based on the compared first and second voltage inputs;
wherein the transistor permits or restrict the flow of current through the transistor based on the voltage output by the differential amplifier, thereby increasing or decreasing the flow of current through the one or more LED lights.

2. The LED lighting assembly of claim 1, wherein the transistor is a metal oxide semiconductor field effect transistor whose gate is electrically connected to the output of the differential amplifier and whose source and drain are electrically connected on a circuit path that is in parallel with the one or more LED lights.

3. The LED lighting assembly of claim 1, wherein
the first voltage input is at a positive input of the differential amplifier; and
the second voltage input is at a negative input of the differential amplifier.

4. The LED lighting assembly of claim 1, further comprising
a first input pin;
a second input pin; and
a transient voltage suppressor electrically connected to the first input pin and the second input pin such that when the LED lighting assembly is subjected to a strike voltage via the first and second input pins, the transient voltage suppressor absorbs the strike voltage.

5. The LED lighting assembly of claim 4, further comprising a rectifier that is electrically connected in parallel with transient voltage suppressor, wherein the rectifier converts alternating current (AC) voltage received by the LED lighting assembly into direct current (DC) voltage.

6. The LED lighting assembly of claim 1, wherein the one or more LED lights are organized into a plurality of groups, the LED lighting assembly further comprising a bypass circuit electrically connected in parallel with at least two of the plurality of groups such that when the voltage across the bypass circuit reaches a threshold level, the bypass circuit shorts, thereby causing current to flow through the bypass circuit instead of through first and second groups of LED lights.

7. The LED lighting assembly of claim 1, further comprising a safety circuit electrically connected in parallel with the transistor, wherein
an output of the logic circuitry is electrically connected to the input of the safety circuit and the logic circuitry controls whether the safety circuit allows or restricts the flow of current through the safety circuit.

8. A light emitting diode (LED) lighting assembly configured to be electrically coupled to a fluorescent lighting fixture that includes a ballast, the LED lighting assembly comprising:
a plurality of groups of LED lights;
a bypass circuit in parallel with at least two of the plurality of groups of LED lights, wherein when a group of LED lights of the plurality of groups experiences a failure resulting in the voltage across the bypass circuit reaching a threshold level, the bypass circuit reconfigures itself so as to allow more current to flow through the bypass circuit, thereby reducing the amount of voltage being applied across the group of LED lights that experienced the failure;
one or more resistive elements electrically connected in parallel with the plurality of groups of LED lights;
a transistor electrically connected in parallel with the plurality of groups of LED lights;
a differential amplifier that
receives a first voltage input from the logic circuitry,
receives a second voltage input from a point on a circuit path that is in series with the transistor,
compares the first voltage input with the second voltage input, and
outputs a voltage to the transistor based on the compared first and second voltage inputs;
wherein the transistor permits or restrict the flow of current through the transistor based on the voltage output by the differential amplifier, thereby increasing or decreasing the flow of current through the plurality of groups of LED lights.

9. The LED lighting assembly of claim 8, wherein the transistor is a metal oxide semiconductor field effect transistor whose gate is electrically connected to the output of the differential amplifier and whose source and drain are electrically connected on a circuit path that is in parallel with the plurality of groups of LED lights.

10. The LED lighting assembly of claim 8, wherein
the first voltage input is at a positive input of the differential amplifier; and
the second voltage input is at a negative input of the differential amplifier.

11. The LED lighting assembly of claim 8, further comprising a safety circuit electrically connected in parallel with the transistor, wherein an output of the logic circuitry is electrically connected to the input of the safety circuit and the logic circuitry controls whether the safety circuit allows or restricts the flow of current through the safety circuit.

12. The LED lighting assembly of claim 8, further comprising
a first input pin;
a second input pin; and
a transient voltage suppressor electrically connected to the first input pin and the second input pin such that when the LED lighting assembly is subjected to a strike voltage via the first and second input pins, the transient voltage suppressor absorbs the strike voltage.

13. The LED lighting assembly of claim 12, further comprising a rectifier that is electrically connected in parallel with transient voltage suppressor, wherein the rectifier converts alternating current (AC) voltage received by the LED lighting assembly into direct current (DC) voltage.

14. A light emitting diode (LED) lighting assembly configured to be electrically coupled to a fluorescent lighting fixture that includes a ballast, the LED lighting assembly comprising:
a plurality of input pins configured to be electrically connected to sockets of the fluorescent lighting fixture;
a transient voltage suppression diode in parallel with the plurality of input pins so as to absorb the strike voltage of the ballast when the fluorescent lighting fixture is turned on;
a rectifier in parallel with the transient voltage suppression diode, the rectifier configured to rectify alternating current (AC) voltage into a direct current (DC) voltage; and
a plurality of LED lights that are subjected to the DC voltage logic circuitry;
one or more resistive elements electrically connected in parallel with the plurality of LED lights;
a transistor electrically connected in parallel with the plurality of LED lights; and
a differential amplifier that
receives a first voltage input from the logic circuitry,
receives a second voltage input from a point on a circuit path that is in series with the transistor,
compares the first voltage input with the second voltage input, and
outputs a voltage to the transistor based on the compared first and second voltage inputs,
wherein the transistor permits or restrict the flow of current through the transistor based on the voltage output by the differential amplifier, thereby increasing or decreasing the flow of current through the plurality of LED lights.

15. The LED lighting assembly of claim 14, further comprising a second transistor disposed in series with the plurality of LED lights and configured to prevent the DC voltage from acting on the LED lights when the florescent lighting unit is initially powered on.

16. The LED lighting assembly of claim 14, wherein the transistor is a metal oxide semiconductor field effect transistor whose gate is electrically connected to the output of the differential amplifier and whose source and drain are electrically connected on a circuit path that is in parallel with the plurality of LED lights.

17. The LED lighting assembly of claim 14, further comprising a metal oxide semiconductor field effect transistor whose gate is electrically connected to an output of the logic circuitry, is disposed in series with the plurality of LED lights, and is configured to prevent the DC voltage from acting on the LED lights when the florescent lighting fixture is initially powered on.

18. The LED lighting assembly of claim 14, wherein
the first voltage input is at a positive input of the differential amplifier; and
the second voltage input is at a negative input of the differential amplifier.

\* \* \* \* \*